UNITED STATES PATENT OFFICE.

KARL ELBEL, OF BIEBRICH, GERMANY, ASSIGNOR TO THE FIRM OF KALLE & COMPANY, AKTIENGESELLSCHAFT, OF BIEBRICH, GERMANY.

MANUFACTURE AND PRODUCTION OF FAST ORTHO-OXY-AZO DYESTUFFS.

1,028,006.        Specification of Letters Patent.        Patented May 28, 1912.

No Drawing.      Application filed September 18, 1911. Serial No. 649,957.

*To all whom it may concern:*

Be it known that I, KARL ELBEL, a subject of the King of Prussia, residing at Biebrich-on-the-Rhine, Germany, have invented certain new and useful Improvements in the Manufacture and Production of Fast Ortho-Oxy-Azo Dyestuffs, of which the following is a specification.

I have found that the diazooxid

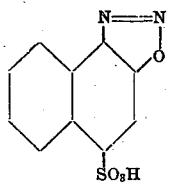

obtainable from 1-amido-2-naphthol-4-sulfonic acid may under certain conditions be chlorinated and that the so obtained chlorinated diazo compound yields, when combined with various phenols, amins, pyrazolones and the like, ortho-oxy-azo dyestuffs of especially bright shades and of excellent fastness against light and the various finishing processes like fulling, potting and crossdyeing.

The chlorination of the naphthalene-1.2-diazooxid-4-sulfonic acid can be effected by blowing chlorin gas into a solution of the diazooxid in fuming sulfuric acid or chlorosulfonic acid at slightly elevated temperature of 25 to 50 degrees centigrade for instance. The reaction can also be carried out in the presence of a chlorin carrier. The best results are obtained, if the chlorin acts on the solution of the diazooxid in fuming sulfuric acid under pressure, and it is to be observed that also in the former case more or less chlorosulfonic acid is formed, by the interaction of the hydrochloric acid, formed during the chlorination, and the fuming sulfuric acid; and consequently both the fuming sulfuric acid and chlorosulfonic acid are present as facilitating reagents during the reaction.

Example 1: 125 kilos naphthalene-1.2-diazooxid-4-sulfonic acid are stirred up with 285 kilos of sulfuric acid monohydrate and completely dissolved by adding 100 kilos fuming sulfuric acid containing 70 per cent. of sulfuric anhydrid at a temperature not above 20 degrees centigrade, and always stirring well. Into the so obtained mass, the temperature of which is raised to about 50 degrees centigrade, a current of chlorin gas is introduced until the weight of the mass has increased by 35 to 36 kilos. After cooling the product is poured on 700 kilos of ice. The new chloro-naphthalene-1.2-diazooxid-4-sulfonic acid separates almost completely from the acid liquor as a mass of greenish-yellow microscopical crystals, which are isolated by filtering and pressing. Instead of sulfuric anhydrid a corresponding quantity of chlorosulfonic acid may be applied.

Example 2: In an autoclave having a stirring device 810 kilos naphthalene-1.2-diazooxid-4-sulfonic acid containing 95.4 per cent. pure substance are mixed at a temperature of about 10 degrees centigrade with 1688 kilos of sulfuric acid monohydrate. 720 kilos of fuming sulfuric acid containing 70 per cent. of sulfuric anhydrid are then run into the mass always stirring well and maintaining the same temperature. The lid of the autoclave is then closed and tightened. Now a vessel containing liquid chlorin is connected with the autoclave through an iron pipe and a tap and the chlorin is allowed to blow over into the autoclave always stirring the mass well and keeping the temperature down to about 25 degrees. The pressure will rise to about 7 or 8 atmospheres at the utmost. If in this manner about 250 or 260 kilos of chlorin have entered into the autoclave the tap is closed and the stirring continued for 12 hours or more. The excess of chlorin contained in the autoclave is then blown off into caustic soda lye. The chlorinated mass is run into a mixture of ice and water and worked up as above described.

Example 3, combination: The chlorinated diazooxid obtained according to Example 1 is stirred up with 300 liters of water and neutralized by adding calcined sodium carbonate. The so obtained solution is gradually run into a solution of 75 kilos of alpha-naphthol in 350 kilos caustic soda lye of 40 degrees Baumé cooled by the addition of 200 kilos of ice. The stirring is then continued for an hour until the combination mass has turned thick. The mass is then diluted with ice and water and acidified by means of hydrochloric acid. The new ortho-oxy-azo dyestuff is separated in this manner as a black crystalline precipitate. It is filtered, pressed and dried. It is easily soluble in hot water with a bluish-red coloration changing to greenish-blue on addition of an alkali. It is dissolved by concentrated sulfuric acid yielding a greenish-blue solution. By various reducing agents it is split into 2-amido-1-naphthol and chloro-1-amido-2-naphthol-4-sulfonic acid. It dyes wool from an acid bath a red-violet, which turns into greenish-blue of excellent fastness on subsequent treatment with a bichromate.

I claim:

1. The process of producing fast ortho-oxy-azo-dyestuffs which comprises treating naphthalene-1.2-diazo-oxid-4-sulfonic acid with chlorin, and combining the resulting chlorinated product with azo dyestuff components.

2. The process of producing fast ortho-oxy-azo-dyestuffs which comprises treating naphthalene-1.2-diazo-oxid-4-sulfonic acid with chlorin in the presence of a reagent facilitating the reaction, and combining the resulting chlorinated product with azo dyestuff components.

3. The process of producing fast ortho-oxy-azo-dyestuffs which comprises treating naphthalene-1.2-diazo-oxid-4-sulfonic acid with chlorin in the presence of a solvent which facilitates the reaction, and combining the resulting chlorinated product with azo dyestuff components.

4. The process of producing fast ortho-oxy-azo-dyestuffs which comprises treating naphthalene-1.2-diazo-oxid-4-sulfonic acid with chlorin in the presence of fuming sulfuric acid, and combining the resulting chlorinated product with azo dyestuff components.

5. The process of producing fast ortho-oxy-azo-dyestuffs which comprises treating naphthalene-1.2-diazo-oxid-4-sulfonic acid with chlorin in the presence of chlorosulfonic acid, and combining the resulting chlorinated product with azo dyestuff components.

6. The process of producing fast ortho-oxy-azo-dyestuffs which comprises treating naphthalene-1.2-diazo-oxid-4-sulfonic acid with chlorin in the presence of fuming sulfuric acid and chlorosulfonic acid, and combining the resulting chlorinated product with azo dyestuff components.

7. The process of producing fast ortho-oxy-azo-dyestuffs which comprises treating naphthalene-1.2-diazo-oxid-4-sulfonic acid with chlorin under pressure, and combining the resulting chlorinated product with azo dyestuff components.

8. The process of producing fast ortho-oxy-azo-dyestuffs which comprises treating naphthalene-1.2-diazo-oxid-4-sulfonic acid with chlorin under pressure in the presence of a reagent facilitating the reaction, and combining the resulting chlorinated product with azo dyestuff components.

9. The process of producing fast ortho-oxy-azo-dyestuffs which comprises treating naphthalene-1.2-diazo-oxid-4-sulfonic acid with chlorin under pressure in the presence of a solvent which facilitates the reaction, and combining the resulting chlorinated product with azo dyestuff components.

10. The process of producing fast ortho-oxy-azo-dyestuffs which comprises treating naphthalene-1.2-diazo-oxid-4-sulfonic acid with chlorin under pressure in the presence of fuming sulfuric acid, and combining the resulting chlorinated product with azo dyestuff components.

11. The process of producing fast ortho-oxy-azo-dyestuffs which comprises treating naphthalene-1.2-diazo-oxid-4-sulfonic acid with chlorin under pressure in the presence of chlorosulfonic acid and combining the resulting chlorinated product with azo-dyestuff components.

12. The process of producing fast ortho-oxy-azo-dyestuffs which comprises treating naphthalene-1.2-diazo-oxid-4-sulfonic acid with chlorin under pressure in the presence of fuming sulfuric acid and chlorosulfonic acid and combining the resulting chlorinated product with azo dyestuff components.

13. As new products the ortho-oxy-azo dyestuffs obtainable by combining chloro-naphthalene-1.2-diazooxid-4-sulfonic acid with azo dyestuff components, these dyestuffs being decomposed when treated with reducing agents into a chloro-1-amido-2-naphthol-4-sulfonic acid on the one hand and into an amido derivative of the employed azo dyestuff component on the other hand.

14. As a new product the ortho-oxy-azo dyestuff obtainable by combining chloro-naphthalene-1.2-diazooxid-4-sulfonic acid with alpha-naphthol which dyestuff is a dark crystalline powder easily soluble in hot water with bluish-red coloration changing to greenish-blue on addition of an alkali, soluble in concentrated sulfuric acid with greenish-blue color, being split by reducing agents into chloro-1-amido-2-naphthol-4-sulfonic acid and 2-amido-1-naphthol, and which dyes in an acid bath on wool a red-violet, changed to a greenish-blue of excellent fastness on subsequent treatment with a bichromate.

In testimony whereof I have signed my name to this specification in the presence of two subscribing witnesses.

KARL ELBEL.

Witnesses:
AUGUST ROTH,
JOHANN RAMCUSEE.